United States Patent
Vazquez Ingelmo et al.

(10) Patent No.: US 8,627,815 B2
(45) Date of Patent: Jan. 14, 2014

(54) SUPPORT ARM, CYLINDRICAL-PARABOLIC SOLAR COLLECTOR SUPPORT AND METHOD OF PRODUCING THE ARM

(75) Inventors: Jorge Vazquez Ingelmo, Castro-Urdiales (ES); Miguel Domingo Osle, Bilbao (ES)

(73) Assignee: Sener, Ingenieria y Sistemas, S.A., Las Arenas, Vizcaya (ES)

( * ) Notice: Subject to any disclaimer, the term of this patent is extended or adjusted under 35 U.S.C. 154(b) by 421 days.

(21) Appl. No.: 12/067,241

(22) PCT Filed: Jul. 18, 2006

(86) PCT No.: PCT/ES2006/000414
§ 371 (c)(1),
(2), (4) Date: Aug. 5, 2008

(87) PCT Pub. No.: WO2007/034008
PCT Pub. Date: Mar. 29, 2007

(65) Prior Publication Data
US 2009/0194657 A1      Aug. 6, 2009

(30) Foreign Application Priority Data
Sep. 19, 2005   (ES) .................................. 200502280

(51) Int. Cl.
*E04D 13/18*     (2006.01)
*E04B 1/32*      (2006.01)
*E04C 3/38*      (2006.01)

(52) U.S. Cl.
CPC ........................................ *E04C 3/38* (2013.01)
USPC .............................. 126/690; 52/639; 29/897.3

(58) Field of Classification Search
USPC .......... 52/639; 248/309.1; 126/694, 600, 684, 126/685, 696; 29/897.3
See application file for complete search history.

(56) References Cited

U.S. PATENT DOCUMENTS 2,945,234 A * 7/1960 Driscoll ........................ 343/915
4,135,493 A * 1/1979 Kennedy ....................... 126/577

(Continued)

FOREIGN PATENT DOCUMENTS

DE      199 52 276       5/2001
WO      WO 02/103256     12/2002

OTHER PUBLICATIONS

Castaneda et al. "Sener Parabolic trough collector desing and testing." www.sener.es/SENER/library.aspx.

(Continued)

*Primary Examiner* — William Gilbert
(74) *Attorney, Agent, or Firm* — Merchant & Gould P.C.

(57) ABSTRACT

The invention relates to a support arm for a cylindrical-parabolic collector, which is intended to be coupled to a central body (1) of the collector in the form of a bracket in a direction that is substantially perpendicular to a focal line (2) of the collector. The inventive arm takes the form of a wedge comprising: a first side (10) which is provided with support devices (11) for supporting at least one mirror (3), a second side (20), and a third side (30) which is provided with support devices (31) such that the arm is supported by the central body (1). The arm is formed by at least one press-formed plate such as to obtain a resistant structure that provides stiffness and a carrying capacity by means of a plurality of ribs (42) which form a lattice comprising a plurality of laminar segments (41) between said ribs.

15 Claims, 4 Drawing Sheets

(56) References Cited

U.S. PATENT DOCUMENTS

| | | |
|---|---|---|
| 4,138,994 A | 2/1979 | Shipley |
| 4,168,696 A | 9/1979 | Kelly |
| 4,309,984 A * | 1/1982 | Dorbeck ................. 126/599 |
| 4,372,651 A * | 2/1983 | Hutchison ................. 359/852 |
| 4,432,343 A * | 2/1984 | Riise et al. ................. 126/602 |
| 4,515,148 A * | 5/1985 | Boy-Marcotte et al. ...... 126/570 |
| 4,756,301 A * | 7/1988 | Dane ................. 126/690 |

OTHER PUBLICATIONS

Lassa. "Technologia solar cilindro-parabolica." www.energetica21.com/esp/esolar06.html.

\* cited by examiner

SUPPORT ARM, CYLINDRICAL-PARABOLIC SOLAR COLLECTOR SUPPORT AND METHOD OF PRODUCING THE ARM

FIELD OF THE INVENTION

The invention relates to a component and to a method for manufacturing said component used in thermal solar plants, in which a fluid (air, water vapor, oil or salts) is heated by means of optical concentration. This fluid moves a turbine or in turn heats another fluid which is responsible for carrying out this task. Nevertheless, the collectors which will be described can also be used in combination with photovoltaic panels.

BACKGROUND OF THE INVENTION

Cylindrical-parabolic solar collector plants are found within the different types of thermal solar plants. In these types of plants the thermal fluid traverses a straight pipe located in the actual focus of an extruded parabola. This parabola, the longitudinal axis of which can be oriented in a north-south or east-west direction, is in turn able to rotate on a single axis to optimize the incident radiation in the opening area of the collector.

Normally the dimensions of a collector of this type are usually around 100-150 meters in state-of-the-art collectors. These collectors, which move by means of a hydraulic mechanism, are formed in turn from several segments the length of which is about 12 meters.

Several methods for manufacturing the arms in the state of the art can be pointed out:

1. Arms Made Based on Welded Tubes:

Until now, the arms on which the mirrors are supported have been made from tubes welded to one another forming a small lattice. However this manufacturing method, providing a light and strong structure in the end, creates two fundamental drawbacks:

- The manual labor associated to the cutting and welding of the tubes makes the end product considerably more expensive.
- The precision finally obtained at the support points of the mirrors is not enough to directly support the mirrors. To that end it is necessary to use intermediate metal parts secured to the arm by means of guides which are finally adjusted to the desired position with the aid of a tool. This operation also has its impact on the final cost of the part.

2. Other Alternatives:

There are other alternatives for manufacturing arms for supporting the mirrors of cylindrical-parabolic collectors which can be emphasized:

Using fiber panels, sandwich panels or the like for generating very light and sufficiently resistant structures.
Using continuous structures which prevent using arms.
The arms must also fulfill a series of characteristics:

1. Geometric Characteristics:

There are different arrangements of the bars for forming the arm depending on the loads for which the collector is sized, the position of the latter within the field and the measurements of the central case and of the original parabola forming the mirrors.

2. Physical Characteristics:

The following can be emphasized among the most important:

Weight of the arms: Between 10-14 kg/part.
Superficial treatment: Hot galvanizing.
Types of profiles used: normally a tubular profile having a thin wall (thickness 1-2 mm).

The field collector, i.e. the set of all collectors collecting solar radiation in order to heat the oil, is a fundamental part in these types of stations. The collectors in which the mirrors are supported are made based on a metal structure, normally galvanized steel, and must fulfill the following requirements:

On one hand they must provide enough precision to position the mirrors such that they concentrate all the radiation on the geometric focus of the theoretical parabola.

On the other hand, and given the large dimensions which these stations usually have, the metal structure must be inexpensive, simple to manufacture and long-lasting.

Throughout the history of these plants, different types of structures capable of satisfying, to a greater or lesser extent, these requirements have been developed.

Two types of support structures can fundamentally be distinguished between.

Collectors made based on what could be called "spatial structure". In these collectors, the support structure forms a continuous whole extending through the entire rear part of the parabola. In these types of structures there is no distinction between central body and arms, all forming a monoblock assembly.

Collectors formed by a central body and arms supporting the mirrors. In these types of collectors the structure can be separated into two parts. On one hand is the central body fundamentally supporting the bending and torsion loads. This central body can be made based on a welded tube or by means of a framework of bars. Arms are fastened to this central body which are responsible for supporting the parabolic mirrors.

The invention relates to these arms, to the central body and to the method for manufacturing said arms.

DESCRIPTION OF THE INVENTION

A first aspect of the invention relates to a support arm for a cylindrical-parabolic collector configured to be coupled to a central body of the collector in the form of a bracket in a direction that is substantially perpendicular to a focal line of the collector, said arm having a wedge shape having:

a first side provided with support means for supporting at least one mirror;
a second side;
a third side provided with support means so that the arm is supported by the central body;

said arm being characterized in that it comprises:
at least one press-formed plate
formed to obtain a resistant structure in order to provide stiffness and carrying capacity by means of a plurality of ribs forming a lattice having a plurality laminar segments between said ribs.
the plate can be galvanized.

In the arm of the invention the plate can be galvanized. The plate can also have a thickness comprised between 1-2.5 mm. The thickness of the plate can preferably be comprised between 1.2-2 mm.

In the arm of the invention the support means of a mirror can be separated a distance a, and:
the first side can have a length comprised between $2.1$-$3.2a$;
the second side can have a length comprised between $2.3$-$3.4a$;
the third side can have a length comprised between $0.8$-$1.2a$;
the end support means can be at a distance comprised between $0$-$0.6a$ of the ends of the first side.

Additionally, in the arm of the invention, the adjacent support means of two mirrors can be at a distance comprised between 0.4-0.6a.

The support means of the arm of the invention can comprise four seats of the mirror.

In addition, in the arm of the invention, the support means can comprise two fixings to the central body configured to allow disassembling the arm from the central body, it being possible for said fixings to be located in:
- a first vertex at which the first side and the third side converge;
- a second vertex at which the second side and the third side converge.

The arm of the invention can further optionally comprise at least one cavity in the laminar segment for lightening.

Likewise, in the arm of the invention the first side can be concave curved in order to have a shape adapted to the semi-parabolic shape of the at least one mirror.

The second side of the arm can likewise be convex curved in order to reach an optimal strength/weight ratio.

The third side of the arm can also be concave curved, having a prominent concavity for lightening.

In the arm of the invention, the plurality of ribs can form a lattice having a framework selected among triangular, trapezoidal and combinations thereof.

A second aspect of the invention relates to a support for a cylindrical-parabolic collector which can comprise at least one arm as described above and a tube shaped central body formed from a planar plate for:
- providing torsional stiffness;
- minimizing the number of fixings to the arm;
- facilitating the assembly/disassembly of the arm.

A third aspect of the invention relates to a method for manufacturing an arm according to that described above, said process comprising:
- a) cutting a plan of an arm in a planar plate for obtaining an initial shape;
- b) press-forming the initial shape in order to form a resistant structure to provide stiffness and carrying capacity by means of a plurality of ribs forming a lattice having a plurality of laminar segments between said ribs to obtain a final shape.

The method can further comprise:
- c) punching the final shape in order to place the support means.

The method can also additionally comprise:
- d) punching the final shape in order to place the support means.

The method for manufacturing the arms of the invention has the following advantages:
- The number of operations necessary in order to arrive at the end product from the raw material is not high, said operations further being very easily automated, which translates into a lower cost.
- Mass producing these types of parts results is higher quality and a greater repetitiveness of the features of the end product by reducing the number of rejections.
- The need to adjust the supports is eliminated since the part with the support points is manufactured according to the required precision, reducing the assembly cost.

BRIEF DESCRIPTION OF THE DRAWINGS

A series of drawings will be very briefly described below aiding to better understand the invention and which are specifically related to an embodiment of said invention, presented as non-limiting example thereof

DESCRIPTION OF A PREFERRED EMBODIMENT OF THE INVENTION

Figure 1:
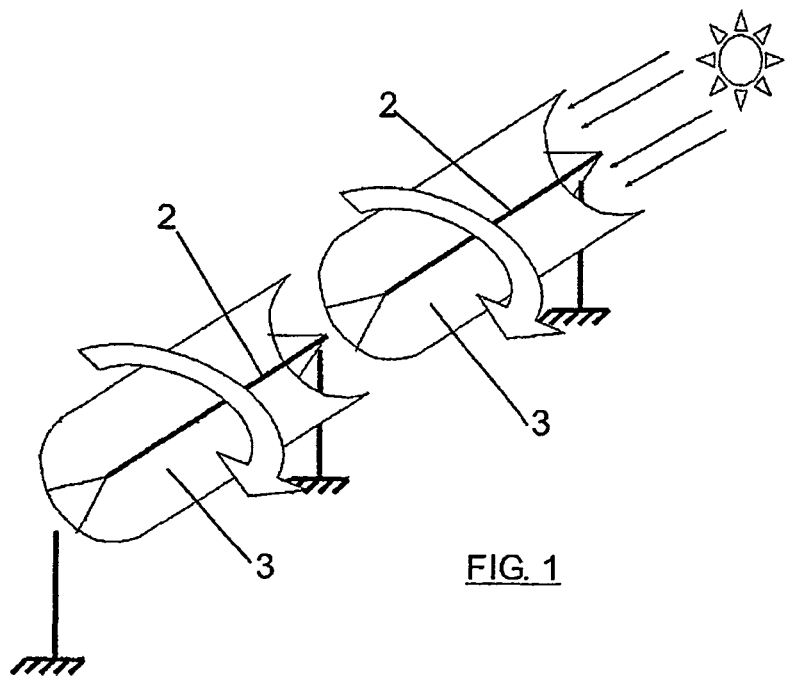
FIG. 1 is a scheme showing a cylindrical-parabolic collector.
Figure 2:
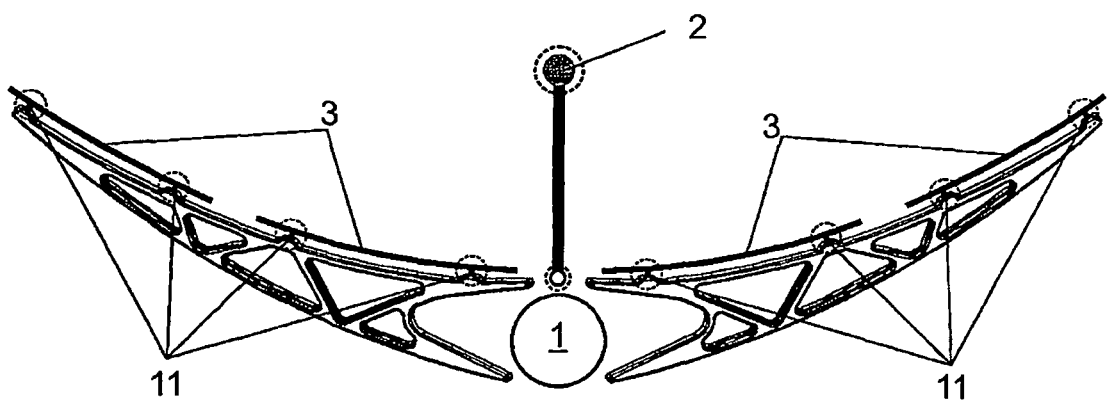
FIG. 2 is a side view showing a cylindrical-parabolic collector according to the invention.
Figure 3:
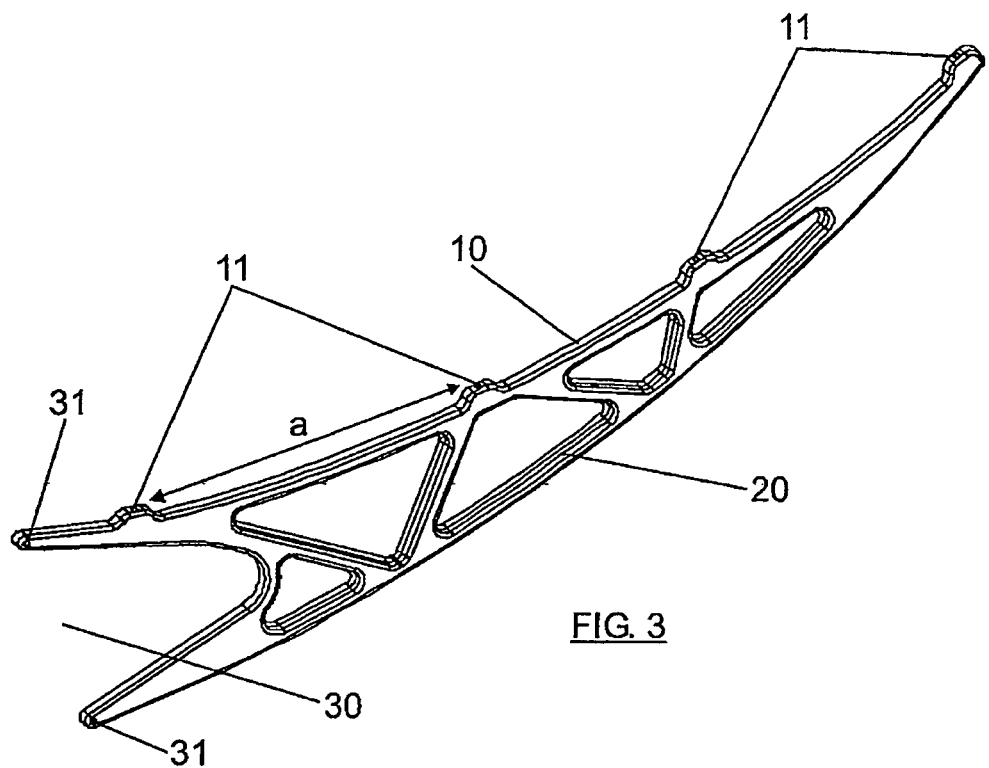
FIG. 3 is a view of an arm of the invention in which the geometry of the arm is indicated.
Figure 4A:
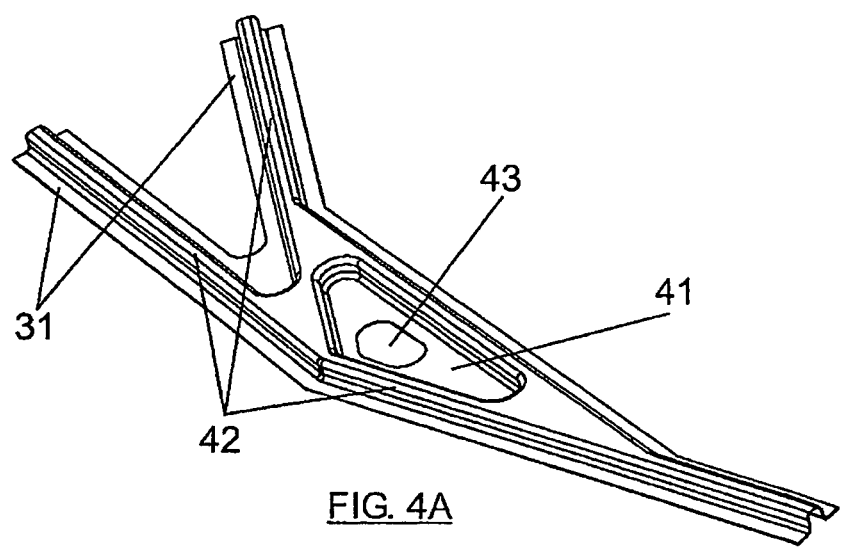
FIGS. 4A, 4B and 4C show three alternative designs of an arm according to the invention.
Figure 4B:
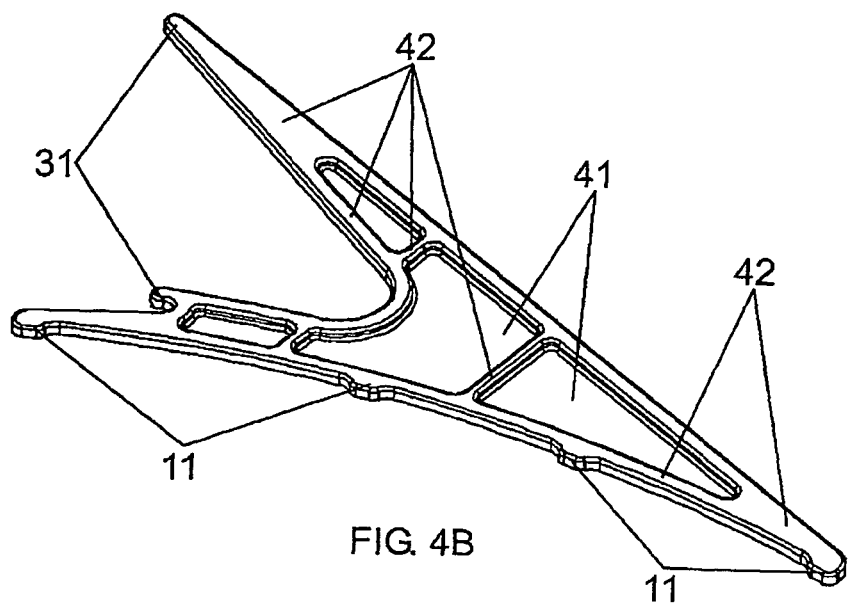
Figure 4C:
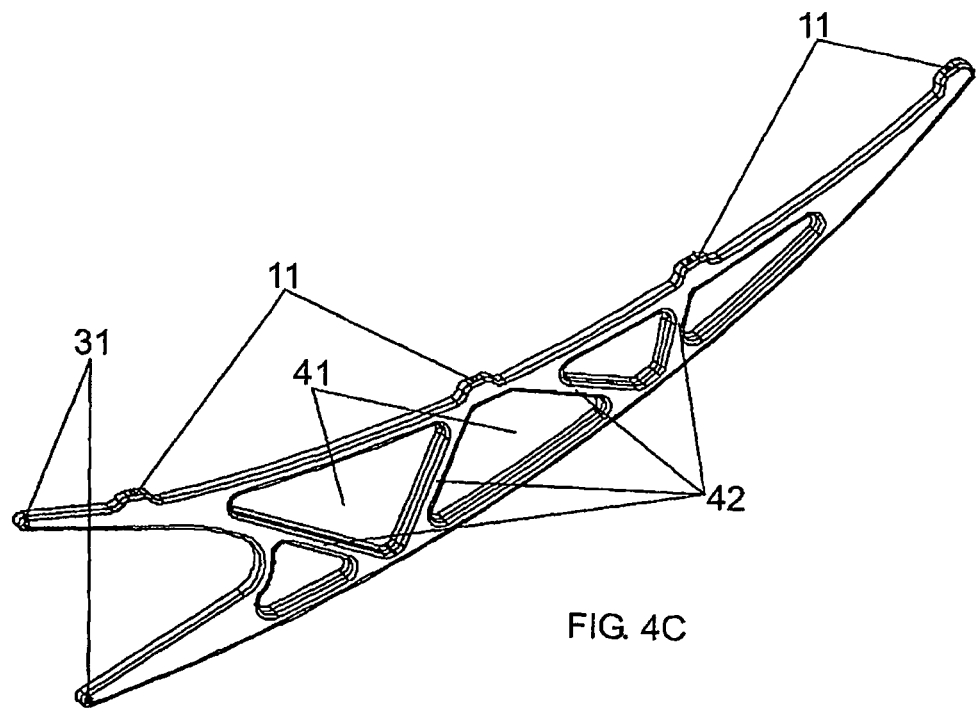
Figure 5:
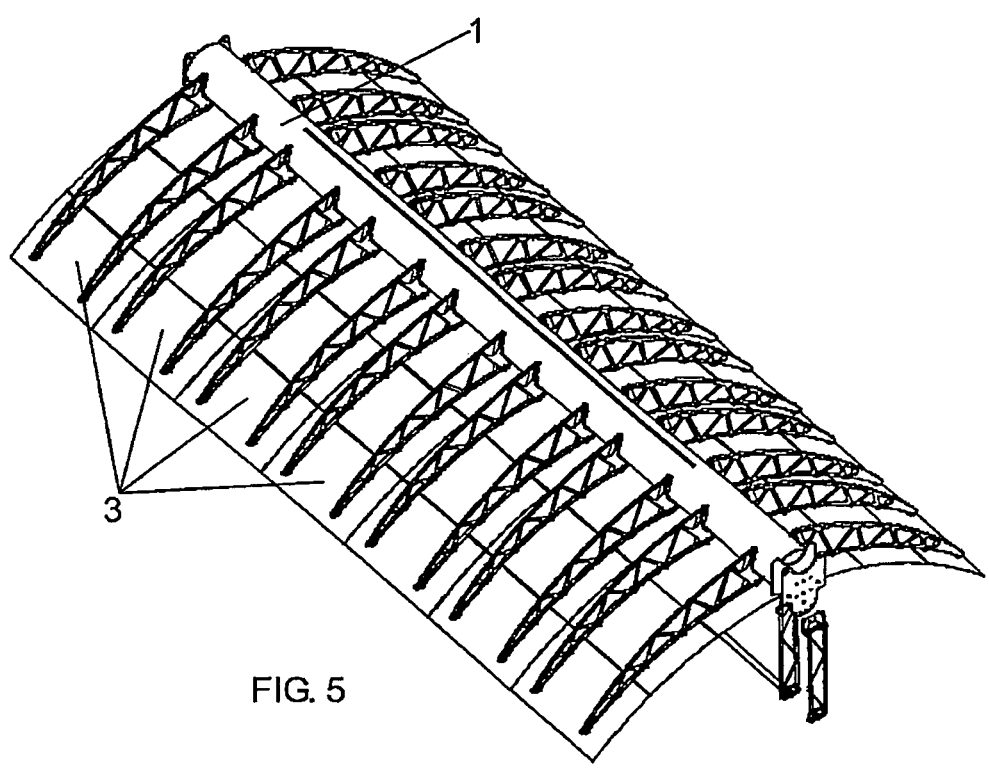
FIG. 5 is a perspective view of a portion of a collector in which a plurality of arms supporting a plurality of mirrors is shown, said arms being connected to a central body.

More than 200,000 arms may be necessary in a commercial solar plant. This huge quantity of necessary units forces the process by means of which these elements are manufactured to be extremely simple in order to lower costs without loosing the capacity of these elements to absorb loads and to provide suitable stiffness and precision.

To that end the arms, which are coupled to the central body 1 of the collector in the form of a bracket in a direction that is substantially perpendicular to the focal line 2 of said collector, have a wedge shape having a first side 10 having the support means 11 for supporting the mirrors 3, a second side 20 and a third side 30 having the support means 31 so that the arm is supported by the central body 1. In the invention, the arm is formed from at least one press-formed plate formed to obtain a resistant structure in order to provide stiffness and carrying capacity by means of a plurality of ribs 42 forming a lattice having a plurality of laminar segments 41 between said ribs 42. These laminar segments can have cavities 43 made in order to lighten the weight of the arm.

The invention also relates to manufacturing parts from a press-formed plate. This process starts from a planar plate with a thickness of between 1 mm and 2 mm. This plate is subjected to successive die-cutting and matrix actions giving it shape in order to achieve the required consistency of the final part. The definitive housings or support means 11 for placing the mirrors 3 can be carried out on the press-formed part during the manufacture process. This allows achieving the required precision for the definitive anchoring of the mirrors 3 in positioning these housings or support means 11.

The fundamental operations comprised in the method are therefore:
- Cutting a planar plate with suitable thickness in order to obtain a desired initial shape.
- Performing successive press-forming/die-cutting operations for forming the planar plate to the desired shape with a series of ridges or ribs 42 providing the required strength and stiffness.
- The holes or support means 11 supporting the mirrors 3 and the support means 31 anchoring the arm to the central body 1 of the collector are positioned by means of punching or an equivalent operation with enough precision so that additional adjustment operations do not have to be carried out.

In an embodiment of the invention the design of the collector with press-formed arms is optimal in terms of performance and cost if a tube formed from a welded plate is used as a central body 1. Plates with thicknesses comprised between 1.2 mm and 2 mm can be chosen for the arms depending on the wind loads which the specific collector will undergo due to its position in the field.

The invention claimed is:

1. A support arm for a cylindrical-parabolic solar collector configured to be coupled to a central body of the collector in a direction that is substantially perpendicular to a focal line of the collector, said arm having a wedge shape comprising:
   a first side wherein first support means are integrally formed and configured to provide a plurality of support points to support the at least one mirror;
   a second side;
   a third side wherein second support means are integrally formed and configured so that the arm is supported by the central body;
   said arm further including at least one press-formed plate providing stiffness and carrying capacity, said plate comprising:
      a plurality of ribs forming a lattice; and
      a plurality of laminar segments between said ribs, said ribs comprising projections relative to the laminar segments.

2. The arm of claim 1, wherein the plate is galvanized.

3. The arm of claim 1, wherein the plate has a thickness comprised between 1-2.5 mm.

4. The arm of claim 3, wherein the plate has a thickness comprised between 1.2-2 mm.

5. The arm of claim 1, wherein the first support means comprises four seats of the mirror.

6. The arm of claim 1, wherein the second support means comprise two fixings to the central body configured to allow disassembling the arm from the central body, said fixings being located in:
   a first vertex at which the first side and the third side converge;
   a second vertex at which the second side and the third side converge.

7. The arm of claim 1, further comprising at least one cavity in the laminar segment for lightening.

8. The arm of claim 1, wherein the first side is concave curved in order to have a shape adapted to the semi-parabolic shape of the at least one mirror.

9. The arm of claim 1, wherein the second side is convex curved in order to reach an optimal strength/weight ratio.

10. The arm of claim 1, wherein the third side is concave curved having a prominent concavity for lightening.

11. The arm of claim 1, wherein the plurality of ribs forms a lattice having a framework selected from triangular, trapezoidal and combinations thereof.

12. A support for a cylindrical-parabolic solar collector, comprising:
   at least one arm arranged and configured to include:
      a first side wherein first support means are integrally formed and configured to provide a plurality of support points to support the at least one mirror;
      a second side;
      a third side wherein second support means are integrally formed and configured so that the arm is supported by the central body;
      a tube shaped central body arranged and configured to provide torsional stiffness, to minimize a number of fixings to the arm, and to facilitate assembly and disassembly of the arm;
      said arm including at least one press-formed plate providing stiffness and carrying capacity, the plate comprising:
         a plurality of ribs forming a lattice; and
         a plurality of laminar segments between said ribs, said ribs comprising projections relative to the laminar segments.

13. A method for manufacturing an arm according to claim 1, wherein the method comprises:
   a) cutting a plan of an arm in a planar plate for obtaining an initial shape;
   b) press-forming the initial shape in order to form a resistant structure to provide stiffness and carrying capacity by means of a plurality of ribs forming a lattice having a plurality of laminar segments between said ribs to obtain a final shape.

14. The method of claim 13, wherein the method further comprises: c) punching the final shape in order to place the support means.

15. The method of any claim 13, wherein the method further comprises: d) punching the final shape in order to place the support means.

* * * * *